United States Patent [19]  [11] 4,348,050
Letournoux et al. [45] Sep. 7, 1982

[54] HINGING DEVICES FOR SEAT BACKS
[75] Inventors: Alain Letournoux, Saint-Jean-Le Blanc; Christian Raye, Etrechy, both of France
[73] Assignee: Societe Industrielle Bertrand Faure, Etampes, France
[21] Appl. No.: 171,359
[22] Filed: Jul. 23, 1980
[30] Foreign Application Priority Data
Aug. 2, 1979 [FR] France .................................. 79 19874
[51] Int. Cl.³ .............................................. A47C 1/026
[52] U.S. Cl. ..................................... 297/365; 16/325; 297/367
[58] Field of Search ............................... 297/363–367, 297/354, 355, 373; 16/144

[56] References Cited
U.S. PATENT DOCUMENTS
3,737,946  6/1973  Giuliani ........................... 297/367 X
3,879,802  4/1975  Werner ............................ 297/363 X FOREIGN PATENT DOCUMENTS
2364754  8/1974  Fed. Rep. of Germany ...... 297/367
2258817  8/1975  France .

Primary Examiner—William E. Lyddane

[57] ABSTRACT

The invention relates to a seat back hinge comprising a control handle, an inner toothed ring integral with the side-plate of the sitting portion, an inner toothed ring integral with the side-plate of the seat back and toothed bolts adapted to coact with these rings, these bolts being able to be moved radially under the action of a rotary cam integral with the handle and being mounted transversely floating as well as said cam.

The side-plates and the cam are mutually centered by cooperation on the one hand of a cylindrical projection of the cam with a bore of one of the side-plates and, on the other hand, of a cylindrical bore of the cam with a projection of the other side-plate.

11 Claims, 3 Drawing Figures

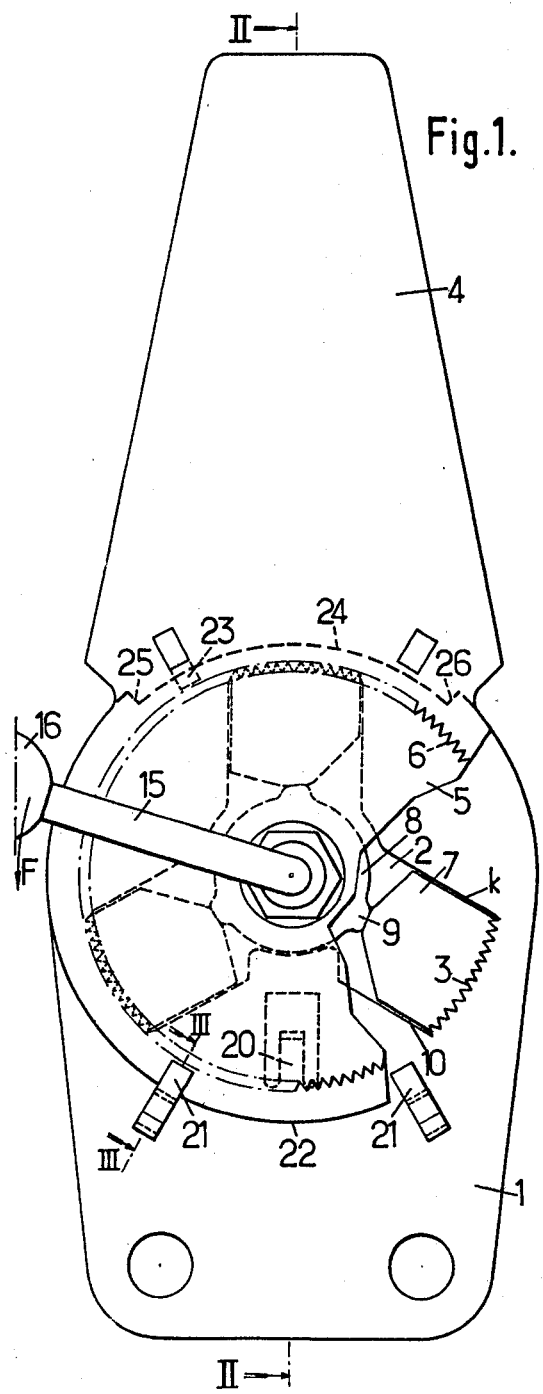
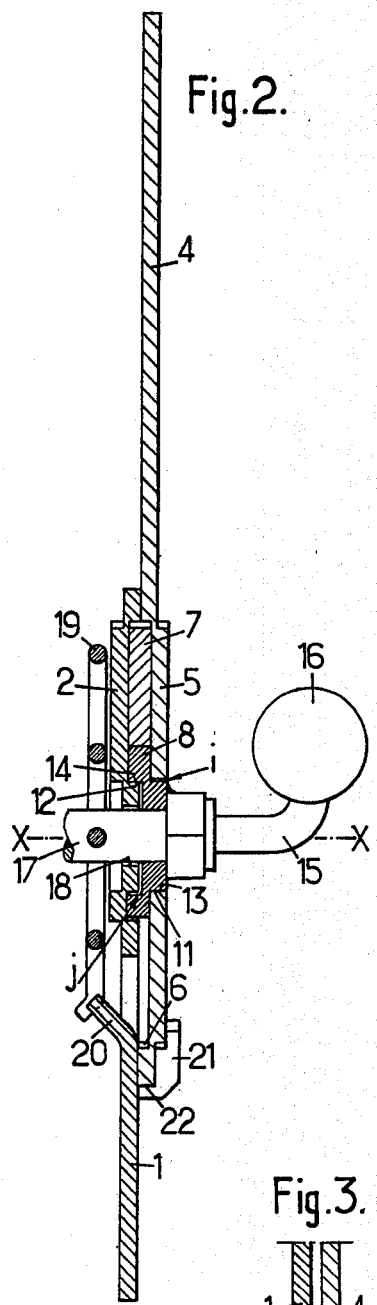
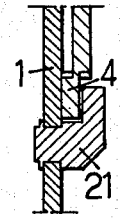

HINGING DEVICES FOR SEAT BACKS

The invention relates to hinging devices for seat backs, particularly for motor vehicles, allowing the inclination of these seat backs to be adjusted and locked in their different adjusted positions.

It relates more particularly, among these hinging devices, to those which comprise a control handle accessible to the person sitting in the seat, a first inner toothed ring integral with a side-plate of the sitting portion, a second inner toothed ring integral with a side-plate of the seat back and coaxial with the first ring, locking means actuatable by the control handle for causing at will the two rings either to be angularly locked together, or angularly free with respect to each other, said means comprising on the one hand n toothed bolts each adapted to coact with the teeth of the two rings and evenly spread out about the common axis of these two rings, inside these latter, at mutual respective angular distances of 360°/n, n being a whole number at least equal to 2 and preferably equal to 3, and on the other hand a flat central rotary cam actuatable by the control handle and adapted to coact with these bolts so as to move them radially away from the axis in order to mesh them with the rings (locking position), or on the contrary to cause them to move closer to said axis which frees them from said rings (unlocked position), and means for resiliently urging the control handle and so the cam to their position corresponding to locking of the device.

It relates more particularly still, among the hinging devices considered, to those in which the bolts, and preferably the cam, are mounted so as to be able to float slightly with respect to the side-plates in transverse directions, while being axially wedged between these two side-plates.

The slightly "floating" mounting of the bolts ensures a very easy centripetal release of these bolts from the teeth of the rings during unlocking, as well as easy meshing of these bolts in these teeth during locking, and the slightly floating mounting of the cam guarantees complete engagement of the teeth of each of the bolts in the facing teeth of the rings, even if the tolerances relative to dimensions and to the mutual centring of the different parts of the mechanism (cam, bolts, rings) are relatively broad.

Hinges of this kind present furthermore the advantage of automatically eliminating all the play in the locked condition.

Such a hinge has for example been described in French Pat. No. 74 02735 belonging to the applicant.

The present invention proposes, for hinges of this kind, a particularly advantageous relative centring mode of the side-plates and the rotary cam, which considerably simplifies the assembly and disassembly while reducing the number of parts of the mechanism.

It is essentially characterized in that the flat rotary cam comprises, on one of its faces, a projection cylindrical in revolution adapted to coact with a small clearance with a complementary bore of one of the side-plates and, on its other face, a bore cylindrical in revolution adapted to coact with a small clearance with a complementary projection of the other side-plate.

In preferred embodiments, recourse is furthermore had to one and/or the other of the following arrangements:

the projection and the bore of the cam correspond, having been obtained simultaneously by semi-cutting out;

each of the clearances between a bore and a projection is of the order of 0.1 mm;

each of the bolts is housed in a radial guide forming part of one of the side-plates and enclosing this bolt with a clearance which is preferably of the order of 0.2 mm;

the cam is welded to a stub shaft integral with the control handle;

the cam is integral with a shaft passing freely through an opening formed in the side-plate with projection.

The invention comprises, apart from these principal arrangements, certain other arrangements which are used preferably at the same time and which will be more explicitly discussed hereafter.

In what follows, two preferred embodiments of the invention will be described with reference to the accompanying drawing in a manner which is of course in no wise limiting.

FIGS. 1 and 2 of this drawing show respectively in a lateral view with parts cut away and in an axial section along II—II of FIG. 1, a seat back hinge constructed in accordance with the invention;

FIG. 3 shows a detail of this hinge in a section along III—III of FIG. 1.

The hinge in question comprises:

a vertical side-plate 1 designed to be fixed to the frame of the sitting portion of the seat, in which side-plate there has been stamped out with partial cutting (a process which will be designated by the expression "semi-cutting out" hereafter) a dished portion whose flat bottom is a circular disc 2 and whose internal edge forms an inner set of teeth 3; and a vertical side-plate 4 designed to be fixed to the frame of the seat back of the seat, in which side-plate there has been semi-cut out another dished portion whose flat bottom is a circular disc 5 and whose internal edge forms an inner set of teeth 6.

These two side-plates 1 and 4 are disposed so that their two sets of teeth 3 and 6 are juxtaposed horizontally and have the same horizontal axis X extending along the width of the seat.

The two discs 2 and 5 form then the two vertical walls of a flat circular case.

It is inside this flat case that are disposed;

on the one hand, three toothed bolts 7 adapted to coact respectively with three portions, angularly offset by 120° about axis X, of the two sets of teeth 3 and 6; and on the other hand, a central rotary cam 8 itself adapted to coact with bolts 7 so as to control their radial movements.

These bolts and this cam are all formed by small plates whose thickness is equal to the inner axial dimension of the case so as to be able to slide jointingly along facing faces of the two discs 2 and 5 defining axially this case.

Furthermore, bolts 7 are mounted so as to be able to move radially with respect to axis X, either outwardly until their outer teeth mesh fully with the inner teeth 3 and 6 when they are pushed by the inclined bosses 9 of cam 8, or toward said axis X when these bosses 9 are angularly retracted after rotation of the cam and when an angular force tending to separate the mutually meshed teeth is exerted on side-plate 4 of the seat back.

This mounting of bolts 8 allowing their radial sliding is provided in a relatively loose way, i.e. so that they can "float" tranversely, which avoids jamming or binding, and facilitates not only the mutual meshing of the sets of teeth but the mutual freeing of these sets of meashed teeth.

Such guiding may be provided by housing the bolts in question in guides with parallel edges 10 added to one of the two discs 2 and 5 inside the case considered, or formed by stamping or semi-cutting out on one of these discs, the distance between the edges of each guide 10 being greater by a clearance k than the width of each bolt.

It may also be provided by cooperation of pins provided on the bolts with buttonholes formed in one of the two discs in question.

The cam is also mounted so as to be able to float slightly in a transverse direction with respect to the two side-plates 2 and 5 so that manufacturing errors due to relatively broad centring tolerances do not prevent all bolts 7 from being fully engaged in the facing sets of teeth 3 and 6 during locking.

These different characteristics are to be found in the hinges of the above-mentioned French patent, but, in the embodiments which were described in that patent, the amplitude of the transverse floating of the bolts and of the cam was relatively large, which required recourse to special centring means for these different elements.

In the present invention, the amplitude of the transverse floating in question is smaller, being generally between 0.05 and 0.5 mm, preferably of the order of 0.1 to 0.2 mm.

As for the relative centering of the different elements, it is here provided in the following way.

Flat cam 8 comprises a projection 11 cylindrical in revolution projecting from one of its faces, and a bore 12 cylindrical in revolution provided in its other face.

Projection 11 defines a slight clearance i between the complementary bore 13 formed in the center of disc 5, and bore 12 defines a slight clearance j between the cylindrical projection 14 provided in the center of the disc 2 and projection axially towards the cam 8.

The projection 11 and bore 12 of cam 8 are preferably obtained by the same semi-cutting out operation, so that they correspond mutually with, preferably, a diameter slightly less for the projection.

It is also by semi-cutting out that projection 14 is preferably formed in disc 2.

Cam 8 is welded both:

to a bent rod 15 terminated by a knob 16 and forming the control handle and to a stub shaft 17 passing axially through a central opening 18 in disc 2 with considerable clearance, this stub shaft being adapted to transmit, directly or not, the control torques of handle 15 to a mechanism similar to the one described here and disposed on the other side of the seat.

There can also be seen in the figures:

a flattened spiral spring 19 constantly urging handle 15 in the locking direction (arrow F), this spring being formed by a wire circular in section whose two parallel ends are hooked respectively onto the stub shaft 17 by passing diametrically therethrough and on a lug 20 bent out from side-plate 1;

two brackets 21 welded to side-plate 1, adapted to jointingly overlap the lower circular edge 22 of side-plate 4, and a third bracket 23 welded to side-plate 4 and adapted to jointingly overlap a circular indented portion 24 of the upper edge of side-plate 1, the role of these three brackets 21 and 23 being to maintain the two side-plates 1 and 4 axially applied one against the other, and the stop of bracket 23 against both ends 25 and 26 of the indented portion 24 ensuring the angular ends-of-travel of the seat back.

The operation of the above-described hinge is the following.

In the locked rest position, the angular force exerted by spring 19 in the direction of arrow F causes the bosses 9 of cam 8 to be applied against bolts 7, which places these latter in meshing relation with the sets of teeth 3 and 6.

Side-plate 4 of the seat back is then locked angularly, the angular forces exerted thereon about axis X being directly transmitted from its teeth 6 to the fixed teeth 3 by the bolts 7 themselves, which mesh simultaneously with these two sets of teeth.

It is to be noted that the clearances k then existing between each bolt 7 and its guide 10 cannot be the source of any jarring when in particular the directions of the angular forces exerted on the seat back are reversed, considering the described mode of transmitting these forces, which does not involve the sides of the bolts nor their guides.

Moreover, because of the slight clearances i and j existing between cam 8 and each of side-plates 1 and 4, which clearances are greater than the inevitable eccentricities of manufacture between the sets of teeth 3, 6, projections 11, 14 and bores 12, 13, each of the three bolts 7 is fully applied in the two sets of facing teeth.

These clearances are automatically and completely suppressed in the locked position of the mechanism.

These two latter characteristics are observed in particular when the toothed rings 3 and 6 are identical, i.e. have the same diameter and the same number of teeth, which corresponds to the preferred embodiment: on such an assumption, each of the teeth of each bolt extends axially over the whole thickness of this bolt, and it is respectively the two axial halves of this tooth which cooperate respectively with the two sets of teeth 3 and 6.

To unlock the hinge, it is sufficient to move handle 15 in the direction opposite arrow F, which angularly moves the bosses 9 away from the heels of bolts 7 with which they cooperate.

The least angular force then exerted on the seat back about axis X urges the bolts in the direction of this axis, which unlocks the hinge: this operation is facilitated by the freely floating mounting of the bolts which prevents any jamming thereof.

The inclination of the seat back of the seat, which is generally applied against the back of the user by means of an appropriate spring not shown, may then be modified at will.

When the desired adjusted position is achieved, it is sufficient to release handle 15 for the expansion of the spring 19 to cause again locking of the hinge: the transverse floating of the bolts allows new meshing between these bolts and the sets of teeth 3 and 6 to be very flexibly initiated, even when the radial facing positioning does not correspond to an exactly centred presentation of one tooth of a bolt opposite each notch of a set of teeth.

Following which, and whatever the embodiment adopted, there is finally obtained a hinge whose construction and operation follow sufficiently from what has gone before.

This hinge has a certain number of advantages with respect to those known heretofore, particularly the following:

the number of component parts of this hinge is particularly small;

the assembly and disassembly of this latter is very simple: in particular, it is possible to weld beforehand cam 8 to handle 15 and stub shaft 17, the unit thus formed being then able to receive the two side-plates 1 and 4 slid axially thereon until they are respectively applied against the two faces of the cam;

the provision of multiple clearances (i, j, k) facilitates the maneuvers and furthermore ensures great efficiency of locking, the whole of these clearances being automatically suppressed during this locking.

As is evident, and as it follows moreover already from what has gone before, the invention is in no wise limited to those of its modes of application and embodiments which have been more especially considered; it embraces, on the contrary, all variations thereof.

We claim:

1. A seat back hinging device comprising:
a control handle accessible to the person sitting in the seat;
a first inner toothed ring integral with a side-plate of the sitting portion of the seats
a second inner toothed ring integral with a side-plate of the seat back portion and coaxial with said first ring;
locking means actuable by the control handle to responsively cause said first and second rings to be either angularly locked or angularly free with respect to one another; said locking means comprising n toothed bolts each adapted to coact with the teeth of said first and second rings, said bolts being spaced apart evenly about the common axis of these rings interiorly thereof, at respective mutual angular distances of the other of 360°/n, n being a whole number at least equal to 1, and a central rotary flat cam actuable by said control handle and adapted to coact with said bolts so as either to move them radially away from said common axis to put them in locking relationship with said first and second rings, or to cause them to move radially nearer said common axis thereby freeing them from said locking relationship; and
means for resiliently urging the control handle and the cam towards their position corresponding to said locking relationship, the bolts and the cam being mounted so as to be able to float slightly transversely with respect to said first and second side-plates while being wedged axially therebetween, said hinging devide further characterized in that the rotary flat cam includes a first cylindrical projection on one of its faces adapted to coact with a first complementary bore in one of said side-plates, said first projection and bore defining a first clearance therebetween and, on its other face, a second cylindrical bore adapted to coact with a second complementary projection on the other of said side-plates defining therebetween a second clearance so that said first and second coacting projections and bores assist in the relative centering of said side-plates.

2. The hinging device as claimed in claim 1, characterized in that the projection and the bore of the cam correspond, having been obtained simultaneously by semi-cutting out.

3. The hinging device as in claims 1 or 2 wherein the number and orientation of the teeth on said first and second toothed rings are identical.

4. The hinging device as in claims 1 or 2, wherein each of the clearances defined between a coacting bore and projection is about 0.1 mm.

5. The hinging device as in claim 4 wherein the number and orientation of the teeth on said first and second toothed rings are identical.

6. The hinging device as in claim 4 wherein each of the bolts cooperates with a radial guide integral with one of the side-plates, said guide and at least one edge of its respective cooperating bolt defining a clearance of about 0.2 mm.

7. The hinging device as in claim 6 wherein the number and orientation of the teeth on said first and second toothed rings are identical.

8. The hinging device as in claim 6 wherein said cam is welded to a stub shaft integral with the control handle.

9. The hinging device as in claim 8 wherein the number and orientation of the teeth on said first and second toothed rings are identical.

10. The hinging device as in claim 6 wherein said cam is integral with a stub shaft passing freely through an opening provided in the side-plate having said second projection.

11. The hinging device as in claim 10 wherein the number and orientation of the teeth on said first and second toothed rings are identical.

* * * * *